GERSHON FRÜHLING
*INVENTOR.*

BY

AGENT

May 21, 1963 G. FRÜHLING 3,090,124
HELIODON
Filed Sept. 26, 1961 2 Sheets-Sheet 2

GERSHON FRÜHLING
*INVENTOR.*

BY Karl F. Ross

AGENT

United States Patent Office 3,090,124
Patented May 21, 1963

3,090,124
HELIODON
Gershon Frühling, Sdeh Nechemjah (Hulioth), Mobile Post, Upper Galilee, Israel
Filed Sept. 26, 1961, Ser. No. 140,846
Claims priority, application Israel Oct. 7, 1960
4 Claims. (Cl. 33—61)

This invention relates to heliodons. The term "heliodon" is used to refer to an instrument by means of which the insolation of a building at differing times of the day and year and for specific latitudes can be simulated and observed with reference to a model of the building and a light source.

Essentially, the heliodon comprises a model-support board which represents the surface of the earth at the position where the building is to be situated and a light source designed to represent the sun. With an existing form of heliodon, a stationary light is projected onto a tilting and rotating platform on which the model to be studied is placed. The platform rotates about a vertical axis to simulate changes of the fall of sunlight at different times of the day and tilts about a horizontal axis for differing latitudes. The light source in the form of a lamp is disposed a fixed distance from the platform and is slidably mounted on a vertical support which is provided with a scale indicating solar declination. It is a disadvantage of such a known form of heliodon that the light source must be accurately positioned with respect to the instrument proper and its vertical position adjusted for the differing solar declinations to be studied.

It is an object of the present invention to provide an improved heliodon which is not subject to the above-mentioned disadvantage.

The heliodon according to this invention comprises essentially a platform designed to carry a model of the building whose insolation is to be tested, this platform being horizontally swingable on a generally upright shaft which in turn is rotatable about its own axis and so journaled to a member articulated to the base, such as an axle coaxially received in the shaft, that the entire unit of shaft and platform is bodily swingable about a horizontal axis with reference to the base. An articulated connection, such as a parallelogrammatic linkage, joins sundial and declination gnomons to the shaft and also supports corresponding scales in fixed relationship to these gnomons whereby the system can be adjusted, with reference to any convenient external light source, to show the illumination of the model for selected hours of the day and seasons of the year. The horal and seasonal adjustments are made by rotating the shaft on its axis and swinging the unit relatively to the base, respectively, whereas a tilting of the platform with reference to the shaft allows for selection of different geographical locations as read on a suitable latitude scale.

With a heliodon in accordance with the invention any external light source, including the sun, may be used and the position of this light source can be maintained stationary throughout the observations.

For a better understanding of the present invention and to show how the same may be carried out in practice, reference will now be made to the accompanying drawing in which.

Figure 1:
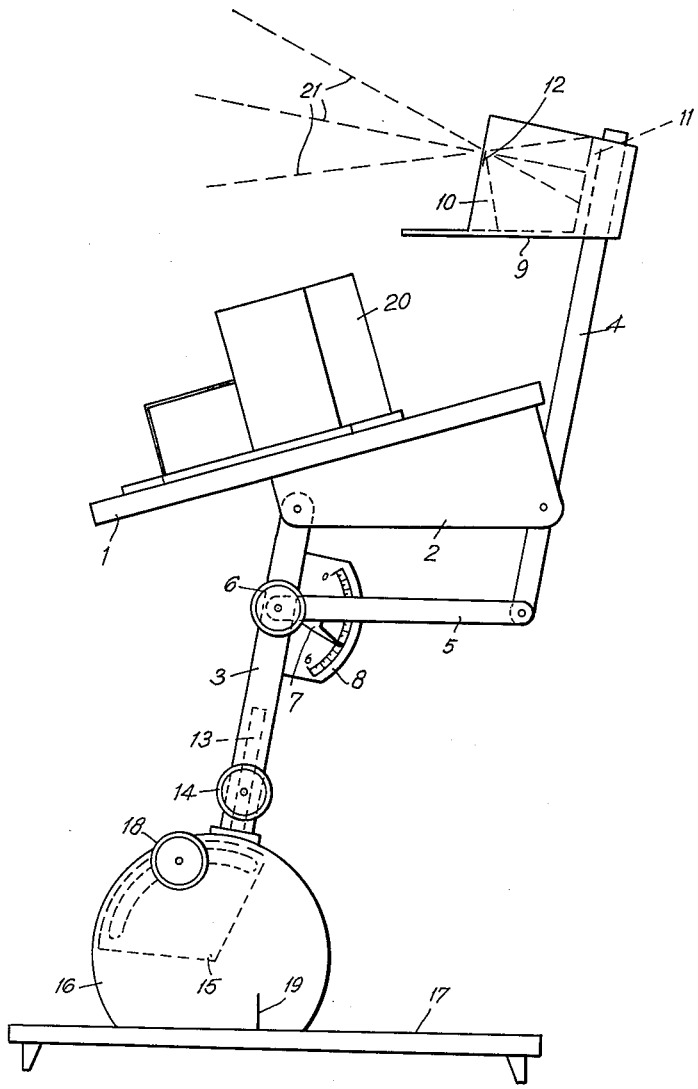
FIG. 1 is a side elevation of a heliodon in accordance with the invention.

As seen in the drawing, the heliodon comprises a model-support platform 1 having a pair of downwardly extending parallel brackets 2, the two lower corners of which are respectively pivoted to one end of a main support shaft 3 and to an intermediate location along a scale-support rod 4. The end of the scale-support rod 4 is articulated to an intermediate location along the main support shaft 3 by means of a coupling rod 5. The angle included between the coupling rod 5 and the main support shaft 3 is controlled by means of a latitude screw 6 whilst a pointer 7 is secured to the coupling rod 5 and is associated with a latitude scale 8 secured to the main support shaft 3. The points of articulation of the bracket 2, main support shaft 3, scale-support rod 4 and coupling rod 5 constitute the four corners of a parallelogram.

Secured to the upper end of the scale-support rod 4, i.e. the end remote from its pivotal junction with the coupling rod 5, is a sundial scale 9 on which is mounted a sundial gnomon 10 whilst extending upwardly from the sundial scale 9 is a declination scale 11 upon which the position of a shadow cast by a declination gnomon 12 mounted on the sundial gnomon 10 can be observed. Three characteristic light rays 21 are shown, by way of example, as being incident on the gnomon 12.

The main support shaft 3 is axially mounted on a support axle 13 so as to be capable of axial rotation about this support axle 13. The main support shaft 3 can be fixed in any axial position with respect to the support axle 13 by means of a clamping screw referred to herein as an hour-adjustment screw 14. The support axle 13 is swingable about a horizontal pivot 15 which is secured between two vertically disposed sectoral support plates 16 which are secured together and are in their turn mounted on a horizontal base 17. The support axle 13 can be clamped in any desired position by means of a clamping screw referred to as a declination screw 18. Extending vertically upwards from the base 17 is a light-source-direction needle 19 which, as can be seen from FIG. 2 of the drawing, is disposed normally to a light-source-direction guide line 19a.

Figure 2:
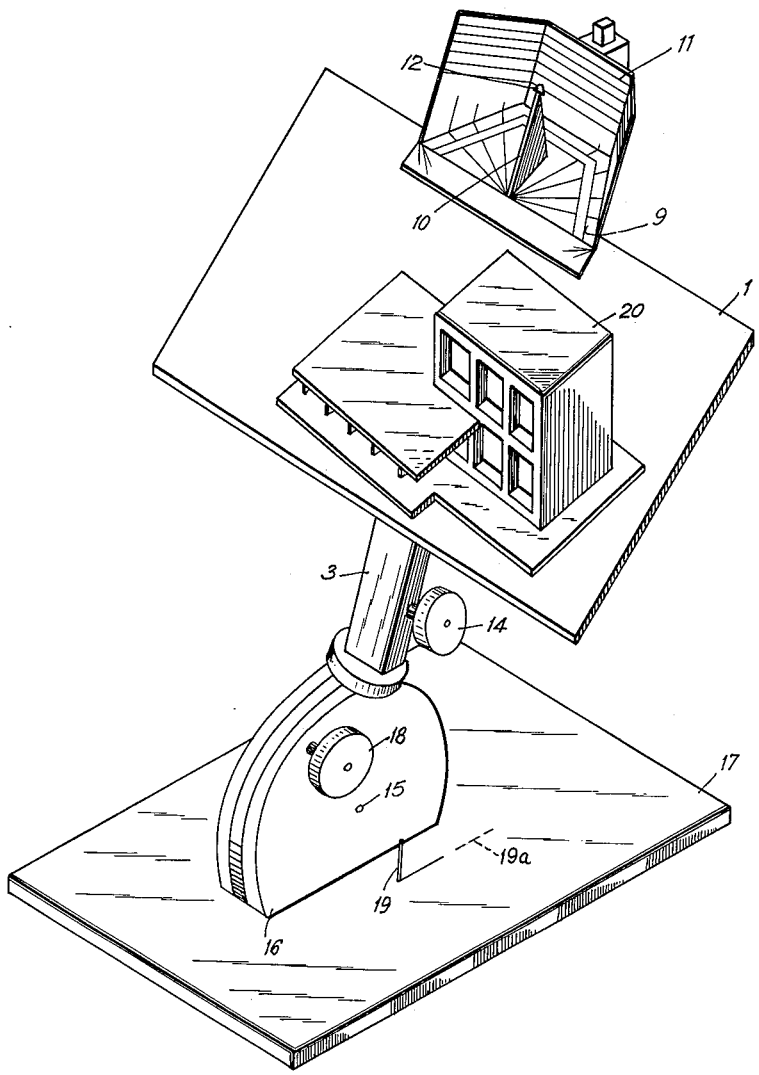
FIG. 2 is a perspective view of the heliodon shown in FIG. 1.

As can be seen from FIG. 2, the sundial scale 9 is marked with divisions corresponding to the hour division of a 24-hour day whilst the declination scale 11 is marked with divisions corresponding to the various seasons of the year.

In operation, and as a preliminary step, the inclination of the model-support platform 1 is first of all adjusted in accordance with the latitude to which it is intended that the observations should refer. This is done by loosening the latitude-adjustment screw 6 and moving the coupling rod 5 until the pointer 7 points to the correct latitude on the latitude scale 8. The latitude-adjustment screw 6 is then tightened so as to retain the support platform 1 in the correct inclination. The heliodon is then disposed at least three meters from a light source (not shown), which can, if desired, be the sun itself, in such a position that the shadow cast by the light source direction needle 19 falls on the guide line 19a. A model 20 of the building, in connection with which the radiation measurements are to be made, is then placed on the model-support platform 1 in a correct orientation. The insolation of the building at various times of the day and year can then be ascertained by observing the irradiation of the model 20 for various declination and hour settings. Thus, if it is desired to observe the degree of insolation at a particular season of the year, the declination screw 18 is loosened and the main support shaft 3 is pivoted about its horizontal pivot 15 until the shadow cast by the declination gnomon 12 on the declination scale 11 coincides with the required season division on that scale. The declination screw 18 is then tightened in this position and the hour screw 14 is loosened and the main support rod 3 is rotated about its axial support axle 13 until the shadow cast by the sundial gnomon 10 on the sundial scale 9 coincides with the required hour division on the scale 9.

It will be readily seen that a heliodon as described constitutes an accurate instrument which is capable of rapid and simple adjustment. Furthermore, with such a heliodon, the requirement of providing an accurately located light source is obviated.

I claim:

1. A heliodon comprising a model-support platform which is pivotally articulated to a support shaft so as to be pivotable about a first horizontal axis, the support shaft being journaled for rotation about its own axis on a member articulated to a base so as to be pivotable about a second horizontal axis, sundial and declination gnomons articulated to the shaft in fixed relative postiion so that the sundial gnomon remains always to be directed parallel to the shaft, sundial and declination scales articulated to said shaft in fixed relationship to their respective gnomons and a latitude scale articulated to said shaft associated with a pointer articulated to the platform for indicating the inclination of the platform with respect to the shaft.

2. A heliodon according to claim 1, wherein the platform is coupled to the shaft by means of a parallelogram, one limb of which is constituted by part of the support shaft and the opposite and parallel limb of which supports the gnomons.

3. A heliodon according to claim 2, wherein the sundial gnomon is mounted parallel to the opposite limb on a sundial scale mounted on the opposite limb.

4. A heliodon according to claim 3, wherein the declination gnomon is mounted on the sundial gnomon and wherein a declination scale is mounted on the opposite limb at an obtuse angle to the sundial scale.

No references cited.